United States Patent
Vinegrad et al.

(10) Patent No.: US 9,745,488 B2
(45) Date of Patent: Aug. 29, 2017

(54) ELECTROSTATIC INKS AND METHOD FOR THEIR PRODUCTION

(75) Inventors: Adi Vinegrad, Rehovot (IL); Ruslan Tovberg, Ashkelon (IL); Eyal Negreanu, Rishon le-zion (IL); Olga Kagan, Ashdod (IL); Yaron Grinwald, Meitar (IL); Reut Avigdor, Modiin (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 11 days.

(21) Appl. No.: 14/396,332

(22) PCT Filed: May 31, 2012

(86) PCT No.: PCT/EP2012/060252
§ 371 (c)(1),
(2), (4) Date: Oct. 22, 2014

(87) PCT Pub. No.: WO2013/178268
PCT Pub. Date: Dec. 5, 2013

(65) Prior Publication Data
US 2015/0129811 A1    May 14, 2015

(51) Int. Cl.
*G03G 9/135* (2006.01)
*C09D 11/52* (2014.01)
*G03G 9/097* (2006.01)
*G03G 9/12* (2006.01)

(52) U.S. Cl.
CPC .......... *C09D 11/52* (2013.01); *G03G 9/09783* (2013.01); *G03G 9/09791* (2013.01); *G03G 9/12* (2013.01); *G03G 9/122* (2013.01); *G03G 9/135* (2013.01)

(58) Field of Classification Search
CPC ........ G03G 9/10; G03G 9/113; G03G 9/1138; G03G 9/135; G03G 9/1355; G03G 9/09783; G03G 9/09791
USPC .................................................. 430/114, 115
See application file for complete search history.

(56) References Cited

U.S. PATENT DOCUMENTS

| 2,513,740 | A | | 7/1950 | Perlin | |
|---|---|---|---|---|---|
| 3,405,683 | A | | 10/1968 | Jons et al. | |
| 3,785,983 | A | | 1/1974 | Inoue et al. | |
| 3,900,003 | A | | 8/1975 | Sato et al. | |
| 3,993,483 | A | * | 11/1976 | Maki | G03G 9/131 430/114 |
| 4,073,266 | A | | 2/1978 | Arneth et al. | |
| 4,342,823 | A | | 8/1982 | Grant et al. | |
| 4,400,079 | A | | 8/1983 | Landa | |
| 4,504,138 | A | | 3/1985 | Kuehnle et al. | |
| 4,690,538 | A | | 9/1987 | Matsui et al. | |
| 5,266,435 | A | | 11/1993 | Almog | |
| 5,346,796 | A | | 9/1994 | Almog | |
| 5,521,046 | A | * | 5/1996 | Materazzi | G03G 9/12 430/115 |
| 5,565,299 | A | * | 10/1996 | Gibson | G03G 9/12 430/137.19 |
| 5,652,282 | A | | 7/1997 | Baker et al. | |
| 5,749,032 | A | | 5/1998 | Landa et al. | |
| 5,858,516 | A | | 1/1999 | Ou-Yang | |
| 6,365,318 | B1 | | 4/2002 | Moffat et al. | |
| 6,376,147 | B1 | * | 4/2002 | Bonsignore | G03G 9/13 430/114 |
| 6,623,902 | B1 | | 9/2003 | Ben-Avraham et al. | |
| 7,189,484 | B2 | | 3/2007 | Kellie et al. | |
| 7,433,635 | B2 | | 10/2008 | Chou et al. | |
| 7,828,888 | B2 | * | 11/2010 | Itano | C09D 11/322 106/31.65 |
| 8,029,963 | B2 | * | 10/2011 | Almog | G03G 9/135 430/115 |
| 2006/0276564 | A1 | * | 12/2006 | Marko | C09D 11/30 523/161 |
| 2008/0163789 | A1 | * | 7/2008 | Silcoff | G03G 9/1355 106/31.6 |
| 2009/0111040 | A1 | | 4/2009 | Veregin et al. | |
| 2011/0091798 | A1 | | 4/2011 | Victor et al. | |
| 2011/0262858 | A1 | | 10/2011 | Nair et al. | |

FOREIGN PATENT DOCUMENTS

| EP | 1594010 | 11/2005 |
|---|---|---|
| WO | WO 2007/130069 | 11/2007 |

OTHER PUBLICATIONS

"Kolates", FedChem LLC, webpage: www.fedchemproducts.com/pdfs/kolate_techbul/KOLATE_TechBul.pdf.
Kalyon, D. M., "Applications of Continuous Mixers", Handbook of Poly Sci. & Tech, vol. 3, Apps & Processing Operations, edited by Cheremisinoff, Marcel Dekker, Inc, 1989, 44pgs.

* cited by examiner

Primary Examiner — Khanh Tuan Nguyen
Assistant Examiner — Haidung Nguyen
(74) Attorney, Agent, or Firm — Dierker & Kavanaugh, P.C.

(57) ABSTRACT

The application relates to a method of producing an electrostatic ink composition, the method comprising: mixing a resin and a conductive pigment in a continuous mixer to form a compounded mixture comprising particles comprising the resin and the pigment; adding a liquid carrier to the compounded mixture, such that the particles comprising the resin and the conductive pigment are dispersed in the liquid carrier; and, before, during or after adding the liquid carrier to the compounded mixture: imparting a charge on the particles comprising the resin and the pigment.

24 Claims, 4 Drawing Sheets

Figure 4

ELECTROSTATIC INKS AND METHOD FOR THEIR PRODUCTION

Electrostatic printing processes typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate. Variations of this method utilize different ways for forming the electrostatic latent image on a photoreceptor or on a dielectric material.

DETAILED DESCRIPTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular examples only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In a first aspect, there is provided a method of producing an electrostatic ink composition, the method comprising:

mixing a resin and a conductive pigment in a continuous mixer to form a compounded mixture comprising particles comprising the resin and the pigment;

adding a liquid carrier to the compounded mixture, such that the particles comprising the resin and the conductive pigment are dispersed in the liquid carrier; and, before, during or after adding the liquid carrier to the compounded mixture:

imparting a charge on the particles comprising the resin and the pigment.

In a second aspect, there is provided an electrostatic ink composition comprising:

a liquid carrier; and particles comprising a resin and a conductive pigment, wherein the particles are dispersed in the liquid carrier. In some examples, a charge adjuvant may be dissolved in the liquid carrier.

The conductive pigment, in the present application, indicates an electrically conductive pigment. The conductive pigment may be a pigment comprising any electrically conductive material. In some examples, the conductive pigment comprises a material selected from a metal or carbon. The metal may be a metal in elemental form or an alloy of two or more metals. The conductive pigment may comprise a metal selected from aluminum, tin, a transition metal, and alloys of any one of more thereof. The transition metal may be selected from, for example, zinc, copper, silver, gold, nickel, palladium, platinum, and iron. Alloys that may be used include, but are not limited to, brass, bronze, steel and chromium.

The conductive pigment, in any of the aspects herein, may have any three-dimensional shape. In some examples, the conductive pigment is in the form selected from a flake, a sphere, a rod, or approximations thereof. In the present application, a flake may be a shape with a first dimension, which may be termed a thickness, less than the other two dimensions. In some examples, the flake has a thickness of at least 0.01 µm, in some examples a thickness of at least 0.05 µm, in some examples a thickness of at least 0.05 µm, in some examples a thickness of at least 0.1 µm, in some examples a thickness of at least 0.15 µm, in some examples a thickness of at least 0.18 µm. In some examples, the flake has a thickness of 1 µm or less, in some examples a thickness of 0.8 µm or less, in some examples a thickness of 0.5 µm or less, in some examples a thickness of 0.4 µm or less, in some examples a thickness of 0.3 µm or less.

In some examples, the flake has a diameter, measured in a direction perpendicular to the thickness, of at least 1 µm, in some examples a diameter of at least 2 µm, in some examples a diameter of at least 3 µm, in some examples a diameter of at least 4 µm, in some examples a diameter of at least 5 µm, in some examples a diameter of at least 6 µm, in some examples a diameter of at least 7 µm, in some examples a diameter of at least 8 µm. In some examples, the flake has a diameter, measured in a direction perpendicular to the thickness, of 50 µm or less, in some examples a diameter of 40 µm or less, in some examples a diameter of 30 µm or less, in some examples a diameter of 20 µm or less, in some examples a diameter of 15 µm or less.

In some examples, the conductive pigment has an aspect ratio of a diameter (measured in a direction perpendicular to the thickness) to its thickness of n:1, where n is at least 2, in some examples at least 5, in some examples at least 10, in some examples at least 20, in some examples at least 30, in some examples at least 35. In some examples, the conductive pigment has an aspect ratio of a diameter (measured in a direction perpendicular to the thickness) to its thickness of n:1, where n is 100 or less, in some examples n is 80 or less, in some examples n is 70 or less, in some examples n is 60 or less, in some examples n is 50 or less.

In some examples, the conductive pigments constitute 15% or less by weight of the solids in the ink composition of the second aspect or the ink composition produced in the first aspect. In some examples, the conductive pigments constitute 12% or less by weight, in some examples 10% or less by weight, in some examples 8% or less by weight of the solids in the ink composition of the second aspect and/or the ink composition produced in the first aspect and/or the electrostatic ink of the third aspect. In some examples, the conductive pigments constitute 1% or more by weight, in some examples 2% or more by weight, in some examples 4% or more by weight, in some examples 6% or more by weight by weight, in some examples 8% or more by weight, of the solids in the ink composition of the second aspect and/or the ink composition produced in the first aspect. The inventors have found that by keeping the amount of conductive pigments below 15 wt %, particularly at 12 wt % or less, of the solids of the ink composition, the likelihood of discharge from the particles during the electrostatic printing process (e.g. when being transferred from one part of a printing apparatus to another under high electric field) is reduced.

Generally, the liquid carrier acts as a dispersing medium for the other components in the electrostatic ink. For example, the liquid carrier can comprise or be a hydrocarbon, silicone oil, vegetable oil, etc. The liquid carrier can include, but is not limited to, an insulating, non-polar, non-aqueous liquid that is used as the medium for toner particles. The liquid carrier can include compounds that have a resistivity in excess of about $10^9$ ohm-cm. The liquid carrier may have a dielectric constant below about 5, in some examples below about 3.

The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). The liquid carriers and other components of the present disclosure are described in U.S. Pat. No. 6,337,168, U.S. Pat. No. 6,070,042, and U.S. Pat. No. 5,192,638, all of which are incorporated herein by reference.

In an example, the liquid carrier constitutes about 20 to 99.5% by weight of the electrostatic ink composition, in some examples 50 to 99.5% by weight of the electrostatic ink composition, for example as produced in accordance with the first aspect or in accordance with the second aspect. In another example, the liquid carrier may constitute about 40 to 90% by weight of the electrostatic ink composition. In another example, the liquid carrier may constitute about 60 to 80% by weight of the electrostatic ink composition, for example as produced in accordance with the first aspect or in accordance with the second aspect. In another example, the liquid carrier may constitute about 90 to 99.5% by weight of the electrostatic ink composition, in some examples 95 to 99% by weight of the electrostatic ink composition, for example as produced in accordance with the first aspect or in accordance with the second aspect.

The resin typically includes a polymer. The resin can include, but is not limited to, a thermoplastic polymer. In some examples, the polymer of the resin may be selected from ethylene acrylic acid copolymers; methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is in some examples from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the examples mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In an example, the resin constitutes about 5 to 90%, in some examples about 5 to 80%, by weight of the solids of the electrostatic ink composition. In another example, the resin constitutes about 10 to 60% by weight of the solids of the electrostatic ink composition. In another example, the resin constitutes about 15 to 40% by weight of the solids of the electrostatic ink composition. In another example, the resin constitutes about 60 to 95% by weight, in some examples from 80 to 90% by weight, of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

The method involves mixing a resin and a conductive pigment in a continuous mixer to form a compounded mixture comprising particles comprising the resin and the pigment, and adding a liquid carrier to the compounded mixture, such that the particles comprising the resin and the conductive pigment are dispersed in the liquid carrier.

The continuous mixer may be selected from an extruder and a kneader. The continuous mixer may be selected from a single-screw extruder, a twin-screw extruder, and a co-rotating disk extruder. The kneader may, for example, be a single-shaft kneader.

The extruder may comprise one or more screws, in some examples two screws, such as in a twin-screw extruder. The one or more screws may rotate at a speed of at least 200 rpm, in some examples at least 400 rpm, in some example at least 600 rpm, in some examples at least 700 rpm, in some examples at least 800 rpm. The one or more screws may rotate at a speed of 1000 rpm or less, in some examples 900 rpm or less, in some examples 800 rpm or less, in some examples 700 rpm or less, in some examples 600 rpm or less, in some examples 500 rpm or less, in some examples 400 rpm or less, in some examples 300 rpm or less. The one or more screws may rotate at a speed of from 100 rpm to 500 rpm, in some examples from 200 rpm to 400 rpm, in some examples from 250 rpm to 300 rpm. If the extruder comprises two or more screws, e.g. in a twin-screw extruder, the two or more screws may be counter-rotating or co-rotating screws. In some examples, the extruder comprises at least two interlocking, or intermeshing, co-rotating screws. This arrangement of screws has been found to be particularly advantageous in being able to mix the conductive pigments and the resin to a high degree without damaging, at least to any significant effect, the conductive pigments, particularly when in the form of a flake, and forming particles of resin that encapsulate the conductive pigments. The amount of material, which may be the amount of solids excluding any liquid material, being extruded by the extruder per hour may be at least 1 kg, in some examples at least 2 kg, in some examples at least 3 kg. The amount of material, which may be the amount of solids excluding any liquid material, being extruded by the extruder per hour may be 10 kg or less, in some examples 7 kg or less, in some examples 5 kg or less, in some examples 4 kg or less, in some examples 4 kg or less, in some examples 3 kg or less. The amount of material, which may be the amount of solids excluding any liquid material, being extruded by the extruder per hour may be from 1 to 5 kg, in some examples 2 kg to 4 kg, in some examples 2.5 kg to 3.5 kg.

In some examples, the method comprises providing the resin and the conductive pigment, then mixing the resin and the conductive pigment in a continuous mixer to form the compounded mixture, then adding the liquid carrier to the compounded mixture to form the electrostatic ink composition. The compounded mixture may contain particles comprising the resin and the conductive pigment and the resin in the particles may partially or fully encapsulate the conductive pigments. The liquid carrier may be added in the same continuous mixer, e.g. extruder, in which the resin and conductive pigment have previously been mixed. In an alternative example, the compounded mixture may be removed from the continuous mixer in which the resin and conductive pigment have been mixed, and then the liquid carrier added, for example in a mixing apparatus, which may be a continuous mixer or other type of mixing apparatus, such as a ball mill.

In some examples, the method comprises providing the resin and the conductive pigment, then mixing the resin and the conductive metallic pigment in the continuous mixer to form a compounded mixture, then adding the liquid carrier to the compounded mixture in the continuous mixer, to form the electrostatic ink composition. In some examples, the liquid carrier is at a temperature of at least 50° C. when added to the resin and the conductive metallic pigment having a coating of surfactant thereon. In some examples, the liquid carrier is at a temperature of at least 70° C. when added to the resin and the conductive metallic pigment having a coating of surfactant thereon. Adding a heated liquid carrier has been found to improve the mixing and efficacy of the resultant ink.

In some examples, the electrostatic ink composition comprises a surfactant. In some examples, the method involves addition of a surfactant to the components of the electrostatic ink composition at any point during its production. A surfactant may be added at any time during the method, for example, before, during or after the production of the compounded mixture. In some examples, the surfactant is added to the compounded mixture, and before, during or after the addition of the liquid carrier, In some examples, the method comprises providing the resin and the conductive pigment, then mixing the resin and the conductive metallic pigment in the continuous mixer to form a compounded mixture, then adding the liquid carrier and a surfactant to the compounded mixture in the continuous mixer, to form the electrostatic ink composition.

The surfactant may be soluble in the liquid carrier. The surfactant may be an oil-soluble surfactant. The surfactant may be a surfactant soluble in a hydrocarbon liquid carrier.

In some examples, the surfactant may be selected from anionic surfactant, cationic surfactant, amphoteric surfactant, non-ionic surfactant, polymeric surfactant, oligomeric surfactant, crosslinking surfactant, or combinations thereof.

The anionic surfactant may be or comprise sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and docusate sodium.

The cationic surfactant may be selected from quaternary amine polymers, protonated amine polymers, and polymers containing aluminum (such as those that are available from Lubrizol Corp., Wickliffe, Ohio). Further examples of cationic surfactants include SOLSPERSE® 2155, 9000, 13650, 13940, and 19000 (Lubrizol Corp.) and other like cationic surfacants.

The amphoteric surfactant may be selected from surfactants that contain compounds having protonizable groups and/or ionizable acid groups. An example of a suitable amphoteric surfacant includes lecithin.

The non-ionic surfactant may be selected from oil-soluble polyesters, polyamines, polyacrylates, polymethacrylates (such as, e.g., SOLSPERSE® 3000 (Lubrizol Corp.), SOLSPERSE® 21000 (Lubrizol Corp.), or the like.

The oligomeric surfacant may be selected from low average molecular weight (i.e, less than 1000) non-ionic surfacants.

The cross-linking surfactant may be selected from polymers or oligomers containing two or more carbon double bonds (C═C) and/or free amine groups such as, e.g., polyamines, crosslinkable polyurethanes, and divinyl benzene.

Other suitable surfactants include OS#13309AP, OS#13309AQ, 14179BL, and 45479AB from Lubrizol Corp, which are surfactants based on polyisobutylene succinic acid with polyethyleneimines. These surfactants are combination polymers that are cationic in nature.

Surfactants typically comprise a head group and a tail group, with the head group and tail group typically of different polarity, e.g. the head group being polar and the tail group being relatively non-polar compared to the head group. The surfactant may comprise an acidic head group, e.g. a head group comprising a carboxylic acid. The surfactant may comprise a basic head group. Basic head groups have been found to be more efficacious than acid head groups, particularly in the final appearance of the printed ink. The basic head group may comprise an amine group, which may be selected from a primary amine group and a secondary amine group. The basic head group may comprise a plurality of amine groups, which may each independently be selected from a primary amine group and a secondary amine group.

In some examples, the surfactant comprises a succinimide. The succinimide may be linked, e.g. via a hydrocarbon-containing linker group, to an amine group. In some examples, the surfactant comprises a polyisobutylene succinimide having a head group comprising an amine.

In some examples, the surfactant is of formula (I)

formula (I)

wherein $R_1$, $R_2$ and $R_3$ are selected from an amine-containing head group, a hydrocarbon tail group and hydrogen, wherein at least one of $R_1$, $R_2$ and $R_3$ comprises a hydrocarbon tail group, at least one of $R_1$, $R_2$ and $R_3$ comprises an amine-containing head group. In some examples, $R_1$ and $R_2$ are selected from a hydrocarbon tail group and hydrogen, with at least one of $R_1$ and $R_2$ comprising a hydrocarbon tail group, and $R_3$ comprises an amine-containing head group. The hydrocarbon tail group may comprise or be a hydrocarbon group, which may be branched or straight chain and may be unsubstituted. The hydrocarbon tail group may comprise or be a hydrocarbon group containing a polyalkylene, which may be selected from a polyethylene, polypropylene, polybutylene. In some examples, the hydrocarbon tail group may contain a polyisobutylene. The hydrocarbon tail group may contain from 10 to 100 carbons, in some examples from 10 to 50 carbons, in some examples from 10 to 30 carbons. The hydrocarbon tail group may be of the formula (II)

P-L-           formula (II), wherein P is or comprises polyisobutylene and L is selected from a single bond, $(CH_2)_n$, wherein n is from 0 to 5, in some examples 1 to 5, —O— and —NH—. In some examples, the amine-containing head group comprises or is a hydrocarbon group having an amine group attached to one of the carbons of the hydrocarbon group. In some examples, the amine-containing head group is of the formula (III)

$$(CH_2)_m[(CH_2)_o NH(CH_2)_p]_q(CH_2)_r—NH_2 \quad \text{formula (III)},$$

wherein m is at least 1, in some examples 1 to 5, q is 0 to 10, o is 0, 1 or 2, p is 1 or 2, r is 0 to 10; in some examples, m is 1, o is 1, p is 1 and q is from 0 to 10, in some examples from 1 to 5, and in some examples r is 1 to 5; in some examples m is 1, q is 0 to 10, in some examples 1 to 10, in some examples 1 to 5, o is 1, p is 1, r is 1.

In some examples, the surfactant is of formula (I), wherein $R_1$ is of formula (II), $R_2$ is H and $R_3$ is of formula (III). In some examples, the surfactant is of formula (I), wherein $R_1$ is of formula (II), wherein L is —$CH_2$—, $R_2$ is H and $R_3$ is of formula (III), wherein m is 1, q is 0 to 10, in some examples 1 to 10, in some examples 1 to 5, o is 1, p is 1 and r is 1. In some examples, the surfactant is or comprises Lubrizol® 6406.

The electrostatic ink composition may comprise surfactant in an amount of, and/or during the method the surfactant may be added in an amount such that the surfactant constitutes, at least 0.5 wt % of the solids in the electrostatic ink composition, in some examples at least 1 wt % of the solids in the electrostatic ink composition, in some examples at least 5 wt % of the solids in the electrostatic ink composition, in some examples at least 7 wt % of the solids in the electrostatic ink composition, in some examples at least 8 wt % of the solids in the electrostatic ink composition, in some examples at least 9 wt % of the solids in the electrostatic ink composition, in some examples at least 10 wt % of the solids in the electrostatic ink composition. The electrostatic ink composition may comprise surfactant in an amount of, and/or during the method the surfactant may be added in an amount such that the surfactant constitutes, from 0.5 wt % to 20 wt % of the solids in the electrostatic ink composition, in some examples an amount of from 1 wt % to 20 wt % of the solids in the electrostatic ink composition, in some examples an amount of from 5 wt % to 20 wt % of the solids in the electrostatic ink composition, in some examples an amount of from 5 wt % to 15 wt % of the solids in the electrostatic ink composition, in some examples an amount of from 8 wt % to 12 wt % of the solids in the electrostatic ink composition, in some examples an amount of about 10 wt % of the solids in the electrostatic ink composition. After addition of the liquid carrier, the method may involve reducing the volume average size of the particles. After addition of the liquid carrier, the method may involve removing at least some particles above a predetermined size. The removing of the particle above a predetermined size may involve filtering the mixture comprising the liquid carrier, the resin and the conductive pigment. In some examples, the removing of the particle above a predetermined size may involve subjecting the mixture comprising the liquid carrier, the resin and the conductive pigment to a centrifugal process.

As mentioned, after addition of the liquid carrier, the method may involve reducing the volume average size of the particles. After addition of the liquid carrier, the method may involve subjecting the mixture to a high shear process to reduce the size of at least some of the particles within the mixture. The high shear process may involve, for example, agitation of the mixture. The high shear process may involve stirring the mixture, for example at a high speed, for example a speed of at least 1000 RPM, in some examples at least 5000 RPM, in some examples at least 10,000 RPM, in some examples at least 15,000 RPM, in some examples at least 20,000. The stirring may be carried out for a period of at least 30 seconds, in some examples at least 1 minute in some examples at least 2 minutes. In some examples, the stirring may be carried out at least 10,000 RPM for at least 2 minutes, in some examples at least 20,000 RPM for at least 2 minutes.

The electrostatic ink composition produced by the method of the first aspect and/or the electrostatic ink composition of the second aspect may contain at least some particles having a particle size of 100 μm or less, in some examples a particle size of 50 μm or less, in some examples a particle size of 30 μm or less, in some examples a particle size of 20 μm or less, in some examples a particle size of 10 μm or less. In some examples, at least 90% by volume of the particles in the electrostatic ink composition produced by the method of the first aspect and/or the electrostatic ink composition of the second aspect may have a particle size of 100 μm or less, in some examples a particle size of 50 μm or less, in some examples a particle size of 30 μm or less, in some examples a particle size of 20 μm or less.

The mixing of the resin and conductive pigment in the continuous mixer may be carried out at a temperature of 80° C. or more, in some examples 90° C. or more, in some examples, 95° C. or more, in some examples 100° C. or more, in some examples at a temperature of 110° C. or more, in some examples at a temperature of 120° C. or more.

The method described herein may include imparting a charge on the particles comprising the resin and the pigment. The charge may be a charge imparted on the particles by virtue of the nature of the resin, e.g. a resin having acidic groups may have a natural charge, i.e. without the further addition of a charge adjuvant and/or a charge director. In some examples, the method involves addition of a charge adjuvant and/or a charge director to the particles, and said addition may be carried out at any stage of the process. Examples of charge adjuvant and charge director are given below. In an example, the charge adjuvant is dissolved in the liquid carrier.

In a second aspect, there is provided an electrostatic ink composition comprising:
  a liquid carrier;
  particles comprising a resin and a conductive pigment, wherein the particles are dispersed in the liquid carrier; and
  a charge adjuvant dissolved in the liquid carrier.

In methods of the prior art, a charge adjuvant has been added to liquid electrostatic ink compositions. However, the charge adjuvant is typically one (e.g. aluminum di-stearate) that is insoluble of the liquid carrier of the electrostatic ink compositions (e.g. a hydrocarbon liquid). The present inventors have found that, when using a continuous mixer to form the electrostatic ink composition, it is advantageous to include a charge adjuvant that is soluble in the liquid carrier.

The charge adjuvant may be an aluminum benzoyl fatty acid hydroxide soap, which may be of formula (i)

formula (I)

wherein —$R_1$ is —$CH_2$-Phenyl
and $R_2$ is an optionally substituted alkyl, in some examples a $C_5$ to $C_{30}$ optionally substituted alkyl, in some examples a $C_7$ to $C_{25}$ optionally substituted alkyl, in some examples $C_{10}$ to $C_{25}$ optionally substituted alkyl, in some examples a $C_{15}$ to $C_{21}$ optionally substituted alkyl, and wherein the alkyl may be branched or straight-chain.

In some examples, the charge adjuvant is an aluminum benzoyl fatty acid hydroxide soap selected from aluminum benzoyl stearoyl hydroxide soap, aluminum benzoyl lauroyl hydroxide soap, aluminum benzoyl myristoyl hydroxide soap, aluminum benzoyl palmatoyl hydroxide soap, aluminum benzoyl arachidoyl hydroxide soap, aluminum benzoyl behenoyl hydroxide soap. In some examples, the charge adjuvant may be present in an amount of at least 5 mg of charge adjuvant per gram of solids in the ink composition, in some examples at least 10 mg of charge adjuvant per gram of solids in the ink composition. In some examples, the charge adjuvant may be present in an amount of 100 mg or less of charge adjuvant per gram of solids in the ink composition, and in some other examples, in an amount of 70 mg or less of charge adjuvant per gram of solids in the ink composition, and in still some further examples, in an amount of 50 mg or less of charge adjuvant per gram of solids in the ink composition. In some examples, the charge adjuvant may be present in an amount of from 5 to 50 mg of charge adjuvant per gram of solids in the ink composition, in some examples 5 to 40 mg of charge adjuvant per gram of solids in the ink composition, in some examples 10 to 30 mg of charge adjuvant per gram of solids in the ink composition. At least 90% by weight of the charge adjuvant may be dissolved in the liquid carrier. In some examples, all of the charge adjuvant is dissolved in the liquid carrier.

The electrostatic ink composition may include a charge director. The method as described here may involve adding a charge director at any stage. The charge director is added to the carrier liquid in order to maintain sufficient electrostatic charge on the ink particles. In some examples, the charge director may comprise ionic compounds, particularly metal salts of fatty acids, metal salts of sulfo-succinates, metal salts of oxyphosphates, metal salts of alkyl-benzene-sulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the ink composition.

The charge director used herein can be any as known in the art such as described in U.S. Pat. No. 5,346,796, which is incorporated herein by reference in its entirety.

In some examples, the charge director comprises a sulfosuccinate moiety of the general formula [$R_{1'}$—O—C(O)CH$_2$CH(SO$_3^-$)C(O)—O—$R_{2'}$], where each of $R_{1'}$ and $R_{2'}$ is an alkyl group. In some examples, the charge director comprises nanoparticles of a simple salt and a sulfosuccinate salt of the general formula MA$_n$, wherein M is a metal, n is the valence of M, and A is an ion of the general formula [$R_{1'}$—O—C(O)CH$_2$CH(SO$_3^-$)C(O)—O—$R_{2'}$], where each of $R_{1'}$ and $R_{2'}$ is an alkyl group, or other charge directors as found in WO2007130069, which is incorporation herein by reference in its entirety. As described in WO2007130069, the sulfosuccinate salt of the general formula MA$_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from the group consisting of Mg, Ca, Ba, NH$_4$, tert-butyl ammonium, Li$^+$, and Al$^{+3}$, or from any sub-group thereof. The simple salt may comprise an anion selected from the group consisting of SO$_4^{2-}$, PO$^{3-}$, NO$_3^-$, HPO$_4^{2-}$, CO$_3^{2-}$, acetate, trifluoroacetate (TFA), Cl$^-$, Bf, F$^-$, ClO$_4^-$, and TiO$_3^{4-}$, or from any sub-group thereof. The simple salt may be selected from CaCO$_3$, Ba$_2$TiO$_3$, Al$_2$(SO$_4$), Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further comprise basic barium petronate (BBP).

In the formula [$R_{1'}$—O—C(O)CH$_2$CH(SO$_3^-$)C(O)—O—$R_{2'}$], in some examples, each of $R_{1'}$ and $R_{2'}$ is an aliphatic alkyl group. In some examples, each of $R_{1'}$ and $R_{2'}$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$ and $R_{2'}$ are the same. In some examples, at least one of $R_{1'}$ and $R_{2'}$ is $C_{13}H_{27}$. In some examples, M is Na, K, Cs, Ca, or Ba. The formula [$R_{1'}$—O—C(O)CH$_2$CH(SO$_3^-$)C(O)—O—$R_{2'}$], and/or the formula MA$_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda. The charge director may be as described in U.S. Pat. No. 5,266,435, which is incorporated herein by reference in its entirety.

In some examples, the charge director constitutes about 0.001% to 20%, in some examples 0.01 to 20% by weight, in some examples 0.01 to 10% by weight, in some examples 0.01 to 1% by weight of the solids of the electrostatic ink composition. In some examples, the charge director constitutes about 0.001 to 0.15% by weight of the solids of the electrostatic ink composition, in some examples 0.001 to 0.15%, in some examples 0.001 to 0.02% by weight of the solids of the electrostatic ink composition.

EXAMPLES

The following examples illustrate a number of variations of the present compositions and methods that are presently known to the inventors. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be acceptable.

Example 1

Figure 1:
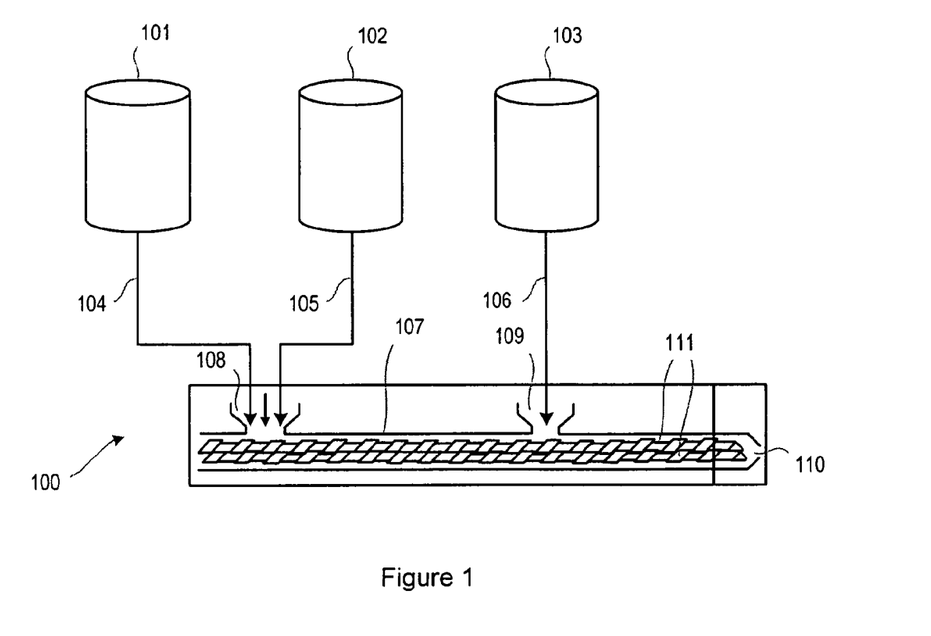
FIG. 1 shows a schematic illustration of an apparatus that can be used in examples of the method described herein.

A schematic representation of the extrusion apparatus 100 used in this Example is shown in FIG. 1. In this Figure is shown a resin silo 101, a pigment silo 102, and oil silo 103. A conduit 104 allows resin to be transported from the resin silo 101 to the twin screws 111 of the extruder 107 via inlet 108. A conduit 105 allows pigment to be transported from the pigment silo 102 to the twin screws 111 of the extruder 107, also via inlet 108. A conduit 106 allows oil as a liquid carrier to be transported from the oil silo 103 to the twin screws 111 of the extruder 107 via inlet 109. As can be seen in this Figure, resin from the resin silo 101 and pigment from the pigment silo 102 are fed together into the extruder 107 via inlet 108. The resin and pigment are mixed within the extruder, and particles comprising the resin and pigment are formed. Subsequently, a liquid carrier is added at inlet 109, and mixed with the particles comprising the resin and the pigment. The resultant mixture exits the extruder at exit 110. While the addition of oil is shown part way along the extruder, this is simply schematic, to illustrate that the oil is added after the mixing of the resin and pigment. As described below, the method may involve mixing resin and pigment in a first pass down the extruder (without adding oil), collecting the resin/pigment mixture once it exits the extruder as exit 110, then feeding this mixture back into the extruder at an inlet (e.g. 108) for a second pass down the extruder, with oil being added during this second pass.

The process in this Example included the following steps:
1. Dry mixing of resins (Nucrel 699, available from Dupont and A-C 5120, available from Honeywell, in particular 15 gr Nucrel 699 and 60 gr A-C 5120) and metallic pigment (#12541 from Schlenk, Ge, 25 gr) on extruder (TSE 24 MC twin screw, Thermo Fisher Scientific). The parameters used in the extrusion process were:
   Screw speed [RPM]—in this procedure the present inventors used in a first pass 700 RPM for receiving homogeneous resin/pigment mixture, and in a second pass, the inventors used 300 RPM. The resins and pigment were first fed through the extruder on a first pass, and then the resultant mixture fed back through the extruder for a second pass, when Isopar liquid carrier was added.
   Material flow [Kg/hr]: in first pass 4 Kg/hr, in second 3 Kg/hr
   Temperature—the screw in the specific extruder used by the inventors was divided into 12 segments (zones), each with individual temperature control. The temperature in first pass was 120° C. along the entire screw, in second pass temperature ranged from 120° C. in segments 1-2 (insertion of hot Isopar) and reduced gradually to 55 C at the compound exit (zone 12).
   Location in screw of Isopar addition-Isopar could have been added in second pass in zone 2 or 7. In the tests carried out by the inventors, it was added in zone 2.
2. The mixing can be in carried out in more than 1 pass in an extruder for better dispersion of the pigment in the solid resin.
3. In the last compounding pass, Isopar is added to give liquid toner at 35-40% solids.
4. The result toner is diluted to 2 wt % solids dispersion and is filtrated on 70 μm mesh (with over 60% yields, and to clear the large size particles and agglomerates).
5. The filtrated dispersion is further treated with benzoate-stearate Al (Kolate 6030, FedChem) for a few hours to achieve high level of charging.
6. In the last step, the composition is ready for charging with a charge director.

Figure 2:
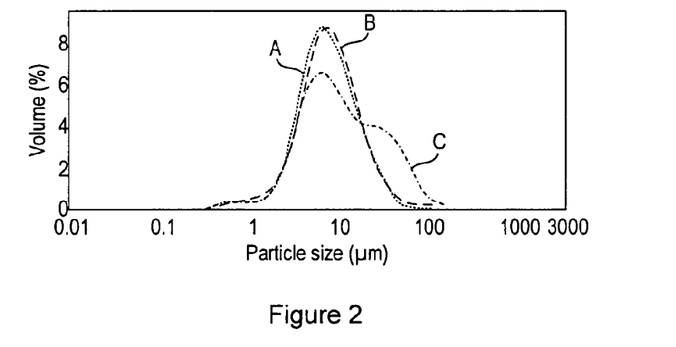
FIG. 2 shows particle size distributions of particles subjected to grinding, extrusion and extrusion followed by filtration.

Filtration—The resultant liquid toner has large particles with a particle size of a few hundred μm. To remove the undesired large particles, the result toner is diluted to 2 wt % solids dispersion and is filtered on 70 μm mesh (with over 60% yield). The resultant particle sizes of the liquid toner before and after filtration and comparison to the comparable Electrostatic ink from grinding process are given in FIG. 2. In this Figure, line B represents a particle size distribution of an ink composition produced using grinding (using an attritor), line C represents a particle size distribution of an ink composition producing using the extruder, but without filtration and line A represents a particle size distribution of an ink composition producing using the extruder with subsequent filtration.

Example 2

Treatment with Kolate—Some prior art methods of producing electrostatic inks have included addition of VCA (Al-distearate) during the grinding of the resin and the ink particles in a hydrocarbon carrier liquid. The VCA additive serves as charge adjuvant in the electrostatic ink with increasing partitioning of the charge and increased particle charge. The present inventors found that VCA added to the compounding process using an extruder can be destroyed and can lose its functionality as a charge adjuvant. As an alternative to VCA, the present inventors treated the 2% compounded liquid toner with benzoate-stearate Al (Kolate 6030, FedChem) for a few hours to achieve high level of charging. Kolate acted as a charge adjuvant, and is soluble in Isopar. The amount of Kolate that was used is 20 mg Kolate per gram of solids of the ink composition. The present inventors consider it may react with the electrostatic ink particles after the compounding of pigment dispersion in the resin, and it may react with the acidic sites of the resin in a similar manner to VCA during grinding. The reaction gives dissolved benzoic acid in the Isopar, which can be identified by standard analytical methods. The PC (particle charging) results are given below:
   PC of silver El from grinding was about 170 μmho
   PC of silver El from compounding without Kolate treatment was about 20 μmho
   PC of silver El from compounding with Kolate treatment was about 220 μmho.

The Q/M Indigo conductivity cell for the measurement of electrophoretic conductivity of charged ink particles has: a high voltage supplier (up to 3 kV), a base and counter electrodes and ND card operated by a Labview software.

High field conductivity (HFC)—is measured in Siemens unit where the for ink dispersion made of oily non polar solvent charged by soap charge directing agents is in the picoSiemens level. This term defines the current collected under the application of a high electric field where charged/ionized electroink particles and charged/ionized species embedded in the liquid phase are developed in electrophoretic way. Since the cell voltage is kept, any little change in the voltage due to charge collection is recorded. Low Field Conductivity (LFC) is built by 2 electrodes gapped by 1.5 mm distance and applied to an AC voltage of 10-15 v at 6 Hz frequency.

LFC is measured in Siemens unit where the for ink dispersion made of oily non polar solvent charged by soap charge directing agents is in the picoSiemens level. This term refer to the charged/ionized species that can be developed under low electric field and thus represents mainly the charged/ionized species exist in the liquid phase.

The difference between HFC and LFC estimates the ink particle conductivity, HFC-LFC=PC, at small ink density up to 2-3% NVS.

The inventors consider that other charge adjuvants soluble in hydrocarbon liquids such as POAS (polyoxoAlstearate) may be used in a similar manner as the Kolate. The basic chemical structure of VCA and Kolate are given below.

Kolate ($R_1$ is $CH_3(CH_2)_{16}$) and $R_2$ is ——$CH_2$-Phenyl)

VCA ($R_1$ and $R_2$ are both $CH_3(CH_2)_{16}$))

SEM Analysis

In analysis using a scanning electron microscope, the ink containing the resins: 80 wt % Nucrel 699 and 20 wt % A-C 5120 (wt % of the solids content), particles of the electrostatic ink produced using the extruder in Example 1 were more rounded and less smeared compared to particles produced using a grinding process. Generally, the present inventors found that using an extruder resulted in less physical distortion of the metallic flakes compared to a grinding process, while still successfully mixing the resin and metallic flakes and producing small particles comprising the resin and the flakes.

Printing Results

The present inventors found that the printing of the electrostatic ink produced in accordance with Example 1 above was slightly better or comparable to the same formulation made by the conventional grinding process. Comparable printing results are given below.

Example 3

Figure 3:
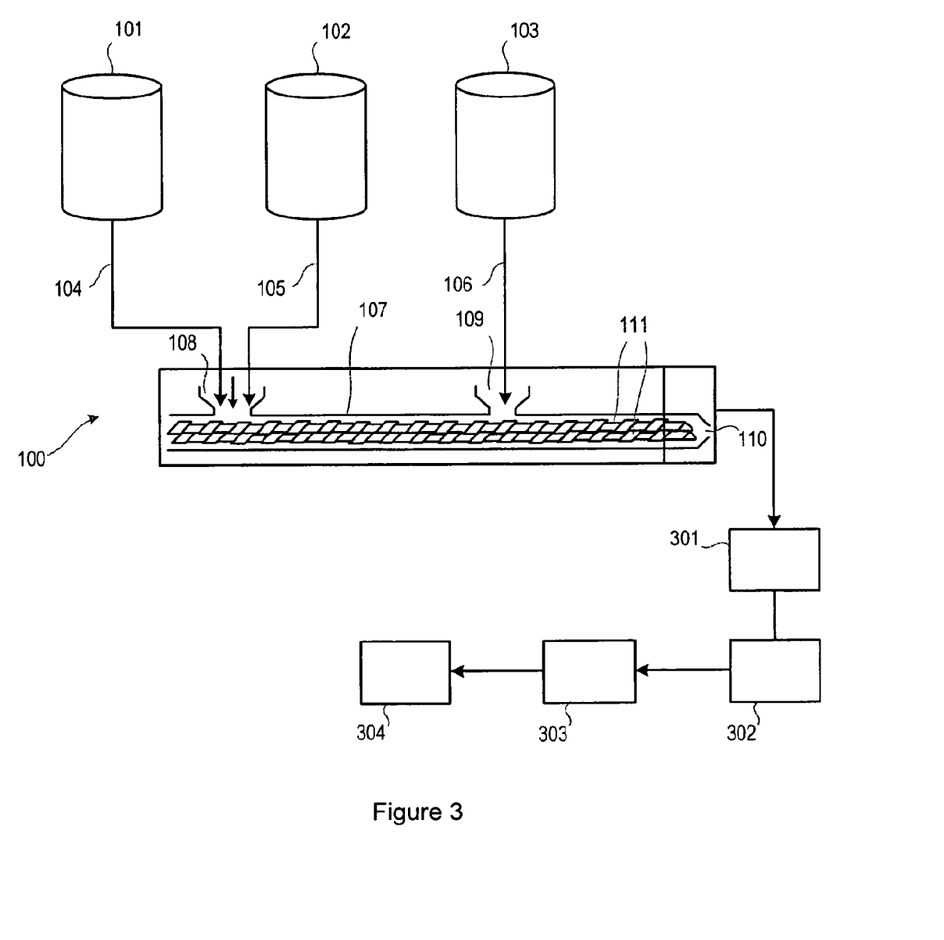
FIG. 3 shows a schematic illustration of an apparatus that can be used in examples of the method described herein.

A schematic representation of the extrusion apparatus 100 used in this Example is shown in FIG. 3. This is the same as FIG. 1, except with additional apparatus components as shown. Components shown in FIG. 3 that are the same as FIG. 1 will not be described here for brevity. Additional component 301 represents a tank for dilution of the mixture that is produced by the extruder 107. In the example below, the mixture exiting the extruder (after addition of oil in the second pass) is about 35 wt % solids, which is then diluted to about 10 wt % solids by further addition of Isopar oil. Component 302 represents a high shear mixer, used to further reduce the particle size after extrusion (this can be used in place of filtration used in Example 1). Component 303 represents an ink concentrator. Component 304 represents a stage where the electrostatic ink composition from the ink concentrator is fed into containers for storage and transportation.

The process in this Example included the following steps:
Dry mixing of resins (Nucrel 699, available from Dupont and A-C 5120, available from Honeywell—15 gr Nucrel 699, 60 gr A-C 5120 and metallic pigment (#12541 from Schlenk, Ge, 25 gr) on extruder (TSE 24 MC twin screw, Thermo Fisher Scientific). The parameters used in the extrusion process were:

Screw speed [RPM]—in this procedure the present inventors used in a first pass 700 RPM for receiving homogeneous resin/pigment mixture, and in a second pass, the inventors used 300 RPM. The resins and pigment were first fed through the extruder on a first pass, and then the resultant mixture fed back through the extruder for a second pass, when Isopar was added.

Material flow [Kg/hr]: in first pass 4 Kg/hr, in second 3 Kg/hr

Temperature—the screw in the specific extruder used by the inventors was divided into 12 segments (zones), each with individual temperature control. The temperature in first pass was 120 C along the entire screw, in second pass temperature ranged from 120 C in segments 1-2 (insertion of hot Isopar) and reduced gradually to 55 C at the compound exit (zone 12).

Location in screw of Isopar addition-Isopar could have been added in second pass in zone 2 or 7. It the tests carried out by the inventors, it was added in zone 2.

1. The mixing can be carried out in more than 1 pass for better dispersion of the pigment in the solid resin.
2. During the extrusion process, hot Isopar (80° C.) and additives are added to give liquid toner having 35-40% non-volatile solids content (by weight). The additives included the dispersant LUB6406, added such that it constituted 10% by weight solids of the ink composition.
3. The resultant compounded mixture is transferred into a dilution container where Isopar is added to dilute the product to the range of 10% by weight non-volatile solids (NVS)
4. Together with Isopar more additives are added such as optimized amount of benzoate-stearate Al (Kolate 6030, FedChem). Also a charge director (CD) can be added at that stage. An example charge director is a natural charge director having the components: (i)

natural soya lecithin, (ii) basic barium petronate, and (iii) dodecyl benzene sulphonic acid, with the components (i), (ii) and (iii) being present in the weight ratios of 6.6%:9.8:3.6%. The charge director can, for example, be added until a low field conductivity, LFC, of 70 is reached.

5. From the dilution the liquid dispersion is flowing through continuous High Shear process for farther agglomerates breaking and reducing the tail of the large PS in the PS distribution. The high shear instrument used was T 25 by IKA which is High-performance dispersing instrument for volumes from 1-2 L. Mechanical force is created by rotor/stator movement. High shear was performed for 2 minutes at 20,000 RPM.

6. The diluted low PS product is then concentrated back to the desired product concentration using a suitable concentrating apparatus, e.g. EPIC equipment or a centrifuge.

7. Last step of the flow is the package filling

Table 1 below shows various processing parameters for tests carried out in accordance with the procedure mentioned above, in particular process conditions for the second pass. It was found that test 5 resulted in the most desired particle size distribution. The screw speed is given in revolutions per minute (RPM) and the flow is the amount of material flowing through the extruder (kg/hour).

TABLE 1

| Test # | RPM | Flow [Kg/hr] |
|---|---|---|
| 1 | 500 | 1.5 |
| 2 | 500 | 3 |
| 3 | 500 | 5 |
| 4 | 300 | 1.5 |
| 5 | 300 | 3 |
| 6 | 300 | 5 |
| 7 | 100 | 1.5 |
| 8 | 100 | 3 |
| 9 | 100 | 5 |

Results for Example 3

Wet Compounding

As indicated above, in the second part compounding pass, hot Isopar (80° C.) and LUB6406 (10 wt % on solids) are added to give liquid toner at 35-40 wt % solids. The specific process gave a complete coating of the metallic pigments, as found by SEM analysis. This is believed to be connected with the use of hot Isopar and charging it in an earlier stage of the compounding. The coating was more effective compared to the cold Isopar charged in a later stage of the compounding, again as determined through SEM analysis of particles.

Dilution, Additives and High Shear

As indicated above, the resultant compounded mixture at 35 wt % NVS is transferred into a dilution container where Isopar is added to dilute the product to the range of 10 wt % NVS. Together with Isopar more additives are added such as optimized amount of benzoate-stearate Al (Kolate 6030, FedChem). Also a charge director can be added at that stage.

Figure 4:
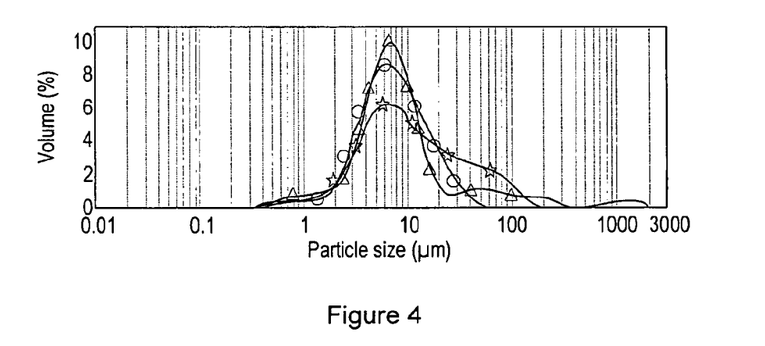
FIG. 4 shows particle size distributions of particles subjected to grinding, and extrusion with and without high shear.

From the dilution the liquid dispersion flows through continuous a High Shear process for further break down agglomerates and reduce the tail of the large particle size in the particle size distribution. Comparative particle size distribution is shown in FIG. 4. Here the line circle with markings indicates a particle size distribution from a comparative example, where an attritor has been used to grind the resin and the pigments. The line with star markings indicates a particle size distribution of the ink composition produced in accordance with an example of the present invention, drawn straight from extruder (35 wt % NVS); The line with triangle markings indicates a particle size distribution of the ink composition produced in accordance with an example of the present invention, having been produced with extrusion, and then subjected to High Shear (10 wt % NVS). Subjecting the ink composition to high shear provides a favourable alternative to the filtration process mentioned in Example 1.

While the compositions, methods and related aspects have been described with reference to certain embodiments, those skilled in the art will appreciate that various modifications, changes, omissions, and substitutions can be made without departing from the spirit of the disclosure. It is intended, therefore, that the compositions, methods and related aspects be limited only by the scope of the following claims. Unless otherwise stated, the features of any dependent claim can be combined with the features of any of the other dependent claims.

The invention claimed is:

1. A method of producing an electrostatic ink composition, the method comprising:
    mixing a resin and a conductive pigment in a continuous mixer to form a compounded mixture comprising particles comprising the resin and the conductive pigment;
    adding a liquid carrier to the compounded mixture, such that the particles comprising the resin and the conductive pigment are dispersed in the liquid carrier; and, before, during or after adding the liquid carrier to the compounded mixture:
    dissolving a charge adjuvant in the liquid carrier; and
    imparting a charge on the particles comprising the resin and the conductive pigment;
    wherein the charge adjuvant comprises an aluminum benzoyl fatty acid hydroxide soap represented by formula (I):

formula (I)

wherein —$R_1$ is —$CH_2$-phenyl, and $R_2$ is an optionally substituted alkyl.

2. The method according to claim 1, wherein the conductive pigment is in the form of flakes.

3. The method according to claim 1, wherein the conductive pigment is in the form of flakes, and wherein at least some of the flakes have a thickness of from 0.01 μm to 2 μm.

4. The method according to claim 1, wherein the conductive pigment is in the form of flakes, and wherein at least some of the flakes have a maximum diameter of 50 μm or less.

5. The method according to claim 1, wherein the continuous mixer is an extruder, and wherein the extruder is selected from the group consisting of a twin-screw extruder, a single-screw extruder, and a co-rotating disk extruder.

6. The method according to claim 5 wherein:
the mixing takes place during a pass down the extruder;
the method further comprises:
collecting the compounded mixture once it exits the extruder; and
feeding the compounded mixture back into the extruder for a subsequent pass down the extruder; and
the adding of the liquid carrier takes place during the subsequent pass.

7. The method according to claim 1, wherein prior to the mixing, the method comprises providing the resin and the conductive pigment.

8. The method according to claim 1, wherein the liquid carrier is at a temperature of at least 50° C.

9. The method according to claim 1, wherein the liquid carrier is at a temperature of at least 70° C.

10. The method according to claim 1, wherein the conductive pigment comprises a material selected from a metal or carbon.

11. The method according to claim 10, wherein the metal is selected from the group consisting of aluminum, tin, a transition metal, and alloys of any one or more thereof.

12. The method according to claim 11, wherein the transition metal is selected from the group consisting of zinc, copper, silver, gold, nickel, palladium, platinum, and iron.

13. The method according to claim 11, wherein the alloys are selected from the group consisting of brass, bronze, and steel.

14. The method according to claim 1 wherein after the mixing and the adding, the method further comprises reducing a particle size of the particles comprising the resin and the conductive pigment by filtration or high shear mixing, wherein a mechanical force in the high shear mixing is created by rotor/stator movement.

15. The method according to claim 1 wherein the particles comprising the resin and the conductive pigment are not exposed to a grinding process.

16. The method according to claim 1 wherein the aluminum benzoyl fatty acid hydroxide soap is selected from the group consisting of aluminum benzoyl stearoyl hydroxide soap, aluminum benzoyl lauroyl hydroxide soap, aluminum benzoyl myristoyl hydroxide soap, aluminum benzoyl palmatoyl hydroxide soap, aluminum benzoyl arachidoyl hydroxide soap, and aluminum benzoyl behenoyl hydroxide soap.

17. An electrostatic ink composition, comprising:
a liquid carrier;
particles comprising a resin and a conductive pigment comprising a metal, wherein the particles are dispersed in the liquid carrier; and
a charge adjuvant dissolved in the liquid carrier, wherein the charge adjuvant is an aluminum benzoyl fatty acid hydroxide soap represented by formula (I):

formula (I)

wherein —$R_1$ is —$CH_2$-phenyl, and $R_2$ is an optionally substituted alkyl.

18. The electrostatic ink composition according to claim 17, wherein the conductive pigment metal is selected from the group consisting of aluminum, tin, a transition metal, and alloys of any one or more thereof.

19. The electrostatic ink composition according to claim 18, wherein the transition metal is selected from the group consisting of zinc, copper, silver, gold, nickel, palladium, platinum, and iron.

20. The electrostatic ink composition according to claim 18, wherein the alloys are selected from the group consisting of brass, bronze, and steel.

21. The electrostatic ink composition according to claim 17, wherein the aluminum benzoyl fatty acid hydroxide soap is selected from the group consisting of aluminum benzoyl stearoyl hydroxide soap, aluminum benzoyl lauroyl hydroxide soap, aluminum benzoyl myristoyl hydroxide soap, aluminum benzoyl palmatoyl hydroxide soap, aluminum benzoyl arachidoyl hydroxide soap, and aluminum benzoyl behenoyl hydroxide soap.

22. The electrostatic ink composition according to claim 17, further comprising a surfactant.

23. The electrostatic ink composition according to claim 17, wherein the charge adjuvant is present in an amount of at least 5 mg of charge adjuvant per gram of solids in the ink composition.

24. The electrostatic ink composition according to claim 17, wherein the charge adjuvant is present in an amount of 100 mg or less of charge adjuvant per gram of solids in the ink composition.

* * * * *